May 16, 1944.  A. RABL  2,348,848
SPEED DRIVE FOR FAST RUNNING MACHINES
ESPECIALLY FOR CYCLE DYNAMO MACHINES
Filed July 28, 1939
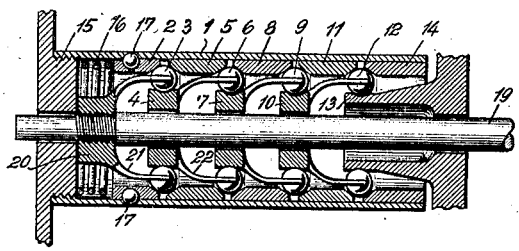
Fig. 1
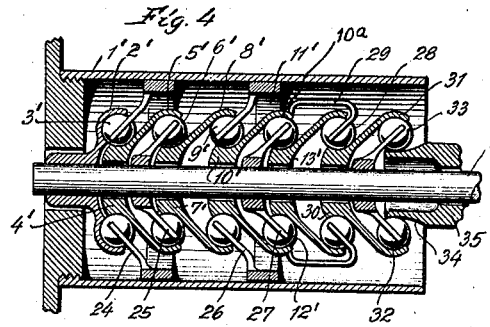
Fig. 3
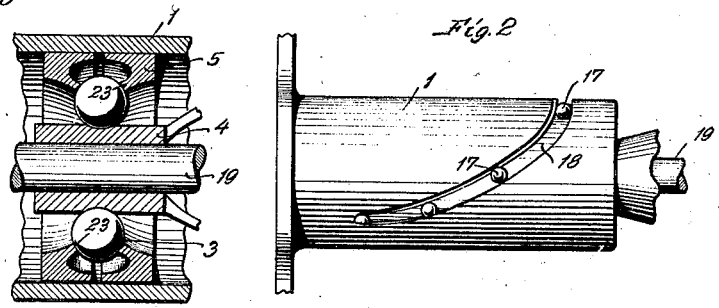
Fig. 2
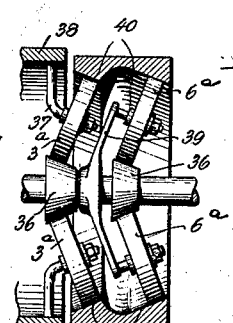
Fig. 5
Fig. 4
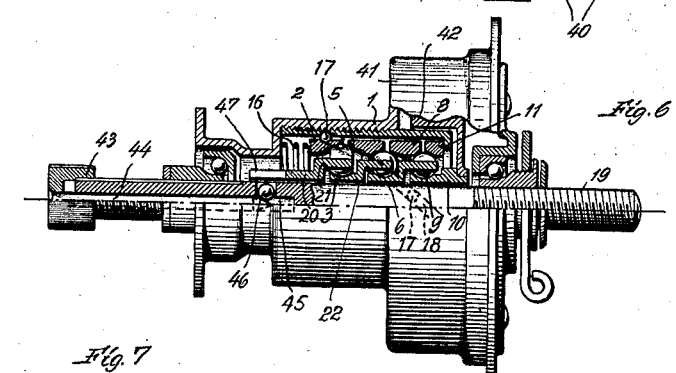
Fig. 6
Fig. 7
Inventor
Alfred Rabl
By
Atty.

Patented May 16, 1944

2,348,848

UNITED STATES PATENT OFFICE 2,348,848

SPEED DRIVE FOR FAST RUNNING MACHINES, ESPECIALLY FOR CYCLE DYNAMO MACHINES

Alfred Rabl, Wiener-Neudorf, Germany; vested in the Alien Property Custodian

Application July 28, 1939, Serial No. 287,152
In Germany August 4, 1938

7 Claims. (Cl. 74—263)

The invention relates to a friction transmission drive for fast running machines especially for cycle dynamo machines where the friction transmission drive is to be built into the hub of a cycle wheel for driving a dynamo similarly incorporated in the hub.

According to the invention the friction transmission drive consists of several successive driving stages of rolling members automatically placed in turn in dependence on the moment of rotation and with pressure applying means coordinated to the turning moment of each driving stage, which consists of a spring and a graduating compensating means by which the pressure is distributed from stage to stage in correspondence with the speed transmission attained in the particular stage. The distribution or compensation of the pressure in the individual speed stages, can inter alia be effected by the outer rings of the frictional transmission drive members having driving means for example balls engaging in a curve in the driving shell, which curve is so formed that it progressively varies the spring pressure.

The invention can be carried out, however, by giving the outer rings of the different driving stages running surfaces of varying steepness of inclination or curvature and mounting them in the driving shell so that they are axially adjustable, but secure against relative rotation.

The invention has primarily the advantage that for all driving stages a common pressure applying means is employed. Since this pressure applying means consists of a spring a particularly flexible and uniform distribution of the pressure on all the driving stages is assured, and rigid binding of the pressure applying means and its frictional members in the driving stages is avoided.

In the appended drawing, constructional embodiments of the invention are illustrated by way of example. Figures 1 and 2 are a longitudinal section and side view respectively of a drive. Figure 3 shows another mounting of the rolling bodies. Figures 4 and 5 show further constructional forms of the drive. Figure 6 is a section through a drive arranged in a cycle wheel hub.

Figure 7 is a view illustrating diagrammatically the varying angular relation of the cone surfaces of the outer bearing rings.

In the drive shell 1, according to Figure 1, four ball bearings are arranged, their outer rings being referred to as 2, 5, 8, 11 and 14, the balls or rolling members as 3, 6, 9 and 12 and their inner rings as 4, 7, 10 and 13. The outer rings 2, 5, 8, 11 and 14 hold the balls between them by means of their oppositely appropriately formed surfaces, and they are placed under the axial pressure of a spring 16 which bears at the one end against the outer ring 2 and at the other end against a hub part 15 securely connected with the drive shell 1.

In order that the pressure on the balls 3 of the first stage is the highest and with succeeding speed stages constantly diminishing, each of the outer rings is provided on its circumference with a ball 17 or the like lying in a recess, and all the balls engage in a common curved groove (Figure 2) in the drive shell 1. Owing to this arrangement the ball 17 of the outer ring will be loaded more or less with axial pressure according to the pitch of the curved track coming against each individual ball 17 and will ensure the running of the drive-transmitting balls 3, 6, 9, 12 free from slip.

Several curved grooves can be provided, which operate simultaneously on several balls. Instead of the curved groove, the coned faces of the outer bearing rings could be arranged of varying angularity corresponding to the axial pressure to be produced. (See Figure 7.)

For the first stage, a ring 20, provided with comb teeth 21 is utilised, which ring is immovably secured on the fixed axle 19 of the wheel. The comb teeth engage either between the balls 3 or form their axes of rotation. In this way the balls or rolling bodies 3 are held fixed as to position but rotatable on their own axes, and are employed as intermediate direction-altering wheels which transmit the rotational movement of the outer ring 2 to the inner ring 4 in an accelerated measure but in an opposite rotational sense. The proportion of speed transmission is therefore entirely dependent on the relative proportion of the diameters of the outer ring 2 and inner ring 4.

The inner ring 4, in its turn, transmits its rotational movement to the balls 6 of the second stage by means of a comb or cage 22, and in an opposite sense to the direction of rotation of the outer ring 5. By this means a speed is imparted to the inner ring of the second stage which is composed of the rotational speed imparted to the balls 6 and the proportionate transmission of the balls 6 to the inner ring 7. On this is imposed the rotational speed of the outer ring 5 and its proportional transmission to the ring 7 through the oppositely driven balls 6. If this method of transmission is now continued by further stages, as illustrated, the speed rises in a rapidly ascending curve. In the illustrated embodiment of the speed drive which is represented full size, a transmission multiplication at the first stage of four and a half times, at the second stage of six times, at the third stage of nineteen times, and at the fourth stage a transmission multiplication of sixty times can be obtained.

This transmission rate is only true however assuming that the rolling members roll with their greatest diameter against the inner and outer rings. If the rolling circle of the outer ring on the balls is displaced to the side of their greatest running circle towards their true axis, for example to the point 23 as shown in Figures 3, a further additional speed transmission is effected. In this constructional example illustrated in Figure 3, the proportion of the rolling circle of the outer ring on the drive transmitting balls to that of the inner ring is 1:3. By this means an additional threefold transmission is attained in all the speed stages.

The speed drive according to the first example, carried out and applied in a cycle hub in the manner illustrated in Figure 6, is furnished with three sets of rolling members, and is coupled with a hub dynamo 42. For ease of reference, the components of the drive are given the same reference numerals as in the first three stages of the drive shown in Figure 1.

For coupling and uncoupling the drive, a nut member 43 is adjustably arranged on the fixed spindle 19 of the wheel and engages with a pin 44 in an axial bore 45 in the spindle 19, and by its rotation causes the conical point of the pin to force a keying member 46, which is freely housed in a radial bore in the spindle, into a slot 47 of the hub part 20 of the first ring comb or cage 21, and thereby secures the ring comb 21 firmly to the spindle. The ball 46, therefore, provides a reaction element whereby drive may be effected. The nut member 43 is reversely rotated to uncouple the drive, so that the point of the pin releases the keying member 46 and this returns automatically from the slot 47 of the comb ring or cage 20, 21. The transmission of the final speed stage to the rotor of the dynamo 42 takes place through the inner ring 10 of the third and last stage. Rings 21 and 2 are rotatable about stationary shaft 19 as an axis, but due to the interconnecting balls 3, a differential rate of rotation will occur, should one of the rings be turned by the other through the medium of the balls. Of course, when the key 46 is disposed partially in the spindle 19 and partially in slot 47, the inner ring 21 is held stationary while the outer ring 2 rotates.

In the constructional embodiment of the speed drive illustrated in Figure 4, all the rolling members are disposed under uniform axial pressure in inclined running tracks. The first stage of this drive consists of an outer ring 2' immovably secured on the fixed wheel spindle 19', a freely rotatable inner ring 4', which is made in one piece with the outer ring 5' of the second stage, and a set of rolling members 3' which are carried around by a comb or cage 24 securely connected to the driving shell 1'. The rolling members 3' transmit their own motion in an accelerated manner to the inner ring 4' and therewith also to the outer ring 5' of the next speed stage. The rolling members 6' of the next higher speed stage are held against rotation involving change of place by means of the comb 25 secured on the fixed spindle 19' of the wheel, so that by their own rotation they transmit the movement of the outer ring 5' in an accelerated manner, but opposite direction, to the inner ring 7' of the speed stage.

The inner ring 7' of the second speed stage is made in one piece with the outer ring 8' of the third speed stage. The rolling members 9' of the third speed stage are set in rotation by the driving shell 1' by means of a comb 26 and receive through their opposite rotating outer ring 8' an additional acceleration. The rolling members 9' with enhanced local rotation drive their inner ring 10' and therewith the outer ring 10a of the fourth speed stage in the same sense of rotation as the drive shell 1'. The rolling members for the fourth speed stage are held fixed as to position, but free rotate, by the comb 27 secured on the fixed spindle 19' so that they only act as intermediate wheels in the movement transmitted to the inner ring 13' in an accelerated manner but in a sense opposed to the direction of rotation of the drive shell 1', which inner ring is securely connected to the outer ring of the next speed stage.

In order to obtain greater acceleration of the rolling members 28 of the fifth stage than is obtainable through the drive from the shell 1', the comb or cage 29 between the rolling members is coupled directly with the outer ring 10a of the fourth stage. Since the comb 29 in this way rotates oppositely to the outer ring belonging to the set 28 with accelerated speed in contrast with the drive shell 1', the transmission to the inner ring 30 of the fifth stage is greater than in the other stages. The transmission to the last stage of the drive is effected by means of the outer ring 31 and a set of rolling members 33 held fixed as to place by a comb 32 secured on the spindle, by which the inner ring 34 and the rotor 35 of a dynamo or the like coupled to it is rotated at the greatest rate of revolution of the whole drive. This transmission also gives an acceleration.

In the speed drive illustrated in Figure 5 the rolling members 3a, 6a, are arranged in circular series around conical wheels 36 and are rotatably mounted on stub axles 37 which in the first stage are secured to an outer ring 38 and in the second stage are formed as arms 39 from the conical wheel 36 of the first stage.

Both sets of rolling members 3a, 6a, possess fixed outer tracks 40 which have a conical form corresponding to that of the conical wheels. The movement imparted to the first set of rolling members from the driving ring is transmitted with acceleration to the conical wheel by reason of the fixed outer track, and this wheel by its rotation carries around with its arms the set of rolling members of the second stage. This set in its turn, drives the conical wheel of the second stage, which drives in an accelerated manner as described either the set of rolling members of the third stage or the object to be driven at speed.

The number of stages of all three drives is dependent only on the number of revolutions desired and the capacity of the particular drive in employment.

As rolling members, balls or rollers may be employed, the latter however preferably being of barrel shape, since owing to their broad bearing surface they exhibit the least tendency to slip.

The speed drive can also be successfully employed for large transmissions from high speed to low speed.

What I claim is:

1. Friction transmission drive comprising several successive driving stages of rolling members automatically placed in turn in dependence on the moment of rotation, pressure applying means coordinated to the turning moment of each driving stage characterised in that the pressure applying means includes a spring and a graduating, compensating means by which the pressure is distributed from stage to stage in correspondence with the speed transmission attained in the particular stage.

2. Friction transmission drive according to claim 1 characterised in that the variation in effect of the spring pressure for the different driving stages is attained by a variation of inclination of formed running faces of the outer rings, which are axially adjustable relatively to, but connected securely for rotation with a driving shell.

3. Friction transmission drive according to claim 1, characterised in that inner running surfaces for each driving stage are made in one piece and a carrier means is provided for carrying around the rolling members of the next stage.

4. Friction transmission drive according to claim 1, characterised in that rolling members including outer bearing rings are provided with combs running in sets of balls with such comb rings for the speed stages of the drive securely connected with a driving shell at the positions of outer bearing rings.

5. Friction transmission drive consisting of several successive driving stages of rolling members automatically placed in turn in dependence on the moment of rotation, pressure applying means coordinated to the turning moment of each driving stage, characterised in that the pressure applying means includes a spring and a graduating, compensating means by which the pressure is distributed from stage to stage in correspondence with the speed transmission attained in the particular stage, each of the driving stages including a pair of interconnected and differentially rotatable rings, a fixed spindle, and means for connecting and disconnecting one of the rings of the first speed stage to said spindle, to thereby control the coupling and uncoupling respectively of the drive.

6. A construction as defined in claim 5 wherein the means for connecting one of said rings of the first speed stage to the spindle includes a pin movable longitudinally in a channel in the spindle, an element threaded on the spindle for engaging and moving the pin, a key member normally housed in the spindle, a portion of said key being movable into the path of rotation of the ring by the movement of the pin, the ring of the first stage being formed with a slot to receive the key member when so moved under the action of the pin.

7. Friction transmission drive comprising several successive driving stages of rolling members automatically placed in turn in dependence on the moment of rotation, each of said stages comprising interconnected inner and outer rings, a driving shell having a curved slot therein, interengaging driving means between said slot and said outer rings, pressure applying means coordinated to the turning moment of said driving stage characterized in that the pressure applying means includes a spring and a graduating compensating means by which the pressure is distributed from stage to stage in correspondence with the speed transmission attained in the particular stage, said curve being so formed as to vary the effect of the pressure of said spring.

ALFRED RABL.